Jan. 22, 1963  W. S. RAFFERTY ETAL  3,074,268
TEMPERATURE COMPENSATION FOR TRANSMISSION THROUGH LIQUID
Filed Aug. 21, 1958  2 Sheets-Sheet 1

United States Patent Office 3,074,268
Patented Jan. 22, 1963

3,074,268
TEMPERATURE COMPENSATION FOR TRANS-
MISSION THROUGH LIQUID
Willard S. Rafferty, Bethel, and Raymond E. Sansom,
New Milford, Conn., assignors to Sperry Products, Inc.,
Danbury, Conn., a corporation of New York
Filed Aug. 21, 1958, Ser. No. 756,408
4 Claims. (Cl. 73—67.5)

This invention relates to the ultrasonic inspection of materials, particularly where the ultrasonic vibrations are transmitted at an angle to normal through a body of liquid before striking the test specimen. In such testing systems the ultrasonic beam is intended to enter the test specimen at an angle which is predetermined for the desired interior inspection of the specimen. In such cases a problem arises due to variations in temperature of the liquid medium, which causes variations in sound velocity therethrough. By Snell's law, such changes in velocity in the liquid medium will cause changes in the angle of refraction within the test specimen. Changes in the desired test angle within the specimen may vary by as much as 12° or more for a temperature change from 32° to 70° F. Temperature variations of this magnitude and even greater, are encountered, for example, in the testing of rail in track where the ultrasonic vibrations are transmitted from within a liquid-filled wheel having a rubber tread in contact with the rail.

It is therefore one of the principal objects of this invention to provide an arrangement wherein ultrasonic vibrations may be transmitted through a liquid medium into a test specimen without being affected by temperature variations in the medium.

Further objects and advantages will become apparent in the following detailed description thereof.

In the accompanying drawings.

Figure 1:
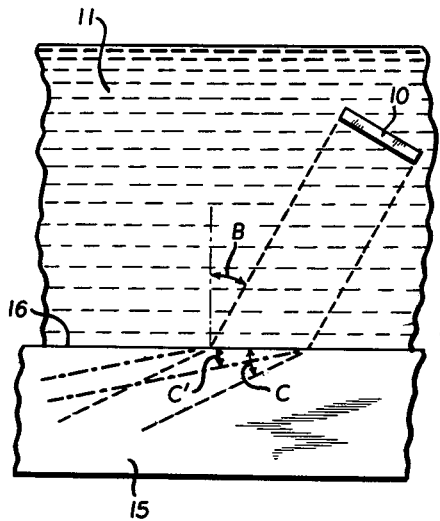
FIG. 1 is a diagrammatic front elevation showing the existing problem.

Referring to FIG. 1 it will be seen that if a piezoelectric transducer, such as a quartz crystal 10, transmits its beam through a liquid medium 11 to test specimen 15 so that the beam strikes the entrant surface 16 at an angle of incidence B, the beam will be refracted within the specimen at an angle such as C. The angle C is the predetermined test angle which is designed to give the best results in searching the interior of the specimen, and it is desired to maintain this angle constant while testing the length of the specimen. Temperature variations of the liquid medium 11 will change the angle of refraction to another value such as, for example, C' which is not the predetermined angle. This is evident from Snell's law wherein $$\frac{\sin B}{\sin C} = \frac{V_B}{V_C}$$

Since the angle B and the velocity of sound in the test specimen ($V_C$) remain constant, it is apparent that a change in $V_B$ (velocity of sound in the liquid medium) in response to temperature change will cause a change in the angle of refraction C to a different value, such as C'.

Figure 3:
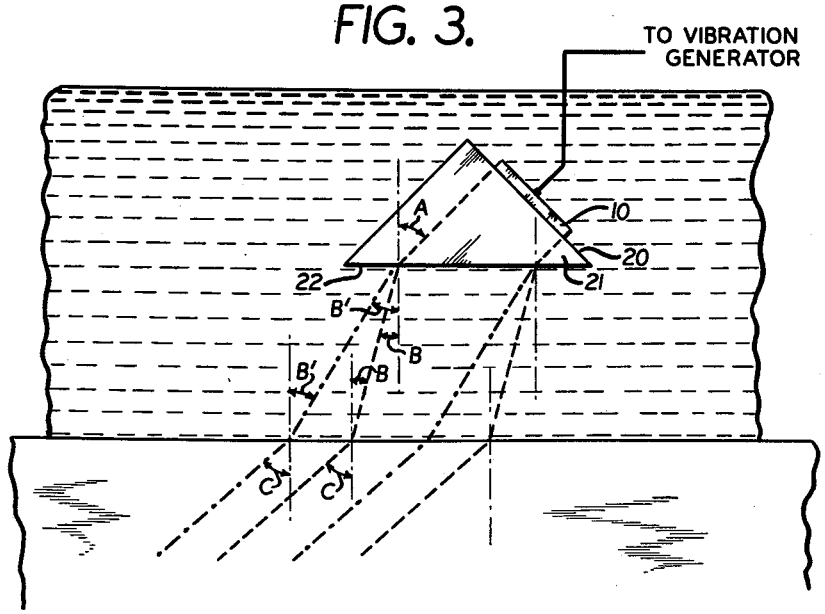
FIG. 3 is a view similar to FIG. 2 illustrating the theory of this invention.

By this invention means are provided for eliminating the effect of changes in $V_B$ (velocity in the liquid medium) on the angle of refraction C so that the latter remains constant regardless of temperature variations in the liquid. Essentially this is accomplished by varying the angle of incidence B in response to temperature variations, and in such direction that the angle of refraction C remains constant. For this purpose the piezoelectric transducer 10 is effectively coupled to one face 20 of a wedge 21 in the liquid, in such manner that the generated vibrations enter the wedge through face 20 and transmit the vibrations to the liquid by way of another wedge face 22 which is maintained parallel to the entrant surface 16 of the test specimen. Referring to FIG. 3 it will be seen why such arrangement eliminates variations in $V_B$ from affecting the angle of refraction C. The angle of incidence A of the beam on leaving surface 22 of the wedge results in an angle of refraction B within the liquid medium. Because of the parallel relationship between surfaces 22 and 16, the angle of refraction B is also the angle of incidence B on the surface 16, resulting in angle of refraction C in the test specimen. If the velocity of the beam in the liquid medium changes in response to temperature variations, the angle of refraction B will change to B', but this means that the angle of incidence on surface 16 will also change to B' and in such direction as to maintain the angle of refraction C unaffected. The mathematical proof of this proposition is as follows:

By Snell's law $$\frac{\sin A}{\sin B} = \frac{V_A}{V_B} \qquad \frac{\sin B}{\sin C} = \frac{V_B}{V_C}$$

$$V_B = \frac{V_A \sin B}{\sin A} \qquad V_B = \frac{V_C \sin B}{\sin C}$$

$$\frac{V_A \sin B}{\sin A} = \frac{V_C \sin B}{\sin C}$$

$$\frac{\sin A}{\sin C} = \frac{V_A}{V_C}$$

Figure 2:
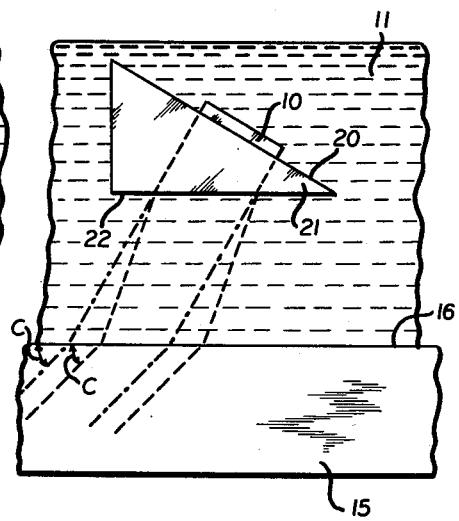
FIG. 2 is a view similar to FIG. 1 but embodying our solution to the problem.

Thus it will be apparent that under the conditions present in the FIGS. 2 and 3 arrangement, the velocity of the sound waves in the liquid medium ($V_B$) has been eliminated as a factor in determining the angle of refraction C in the test specimen. Changing the sound velocity to $V_{B'}$ has no effect on the angle of refraction C, but merely changes the point of entry into the test specimen.

Figure 4:
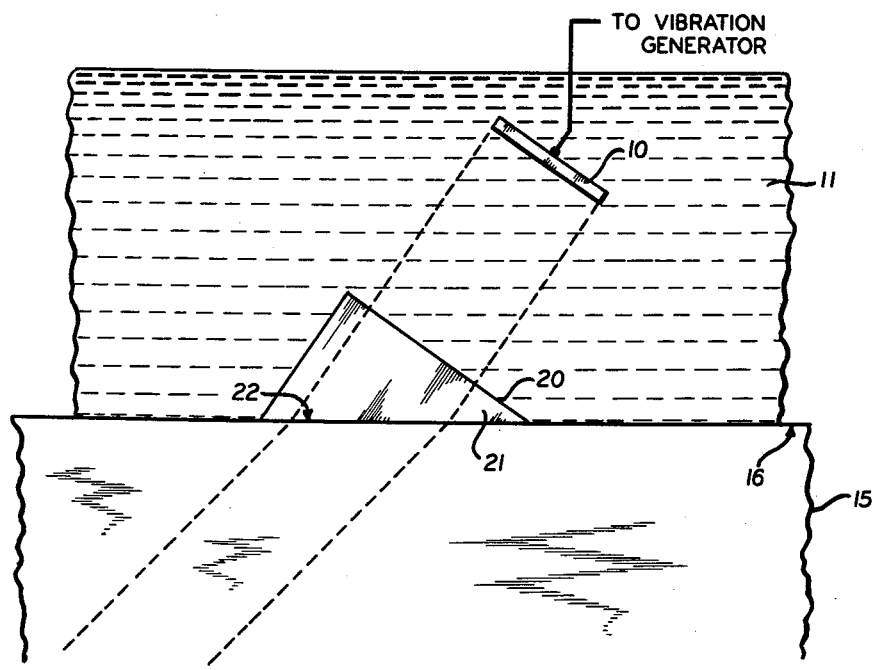
FIG. 4 is a view showing a further embodiment of this invention.

Referring to FIG. 4, a further embodiment of this invention is shown in which the disadvantage of beam displacement as shown in FIG. 3 is overcome. This is obtained by placing the corrective wedge closer to the entering surface of the piece being tested 16. The closer the correcting wedge is placed to this surface the less beam displacement there is so that in actuality if the corrective wedge is placed on the testing surface 16, no beam displacement will be evident. The transducer 10 remains effectively coupled acoustically to face 20 of the wedge by means of the liquid.

Having described our invention, what we claim and desire to secure by Letters Patent is:

1. A device for transmitting ultrasonic vibrations through a liquid medium into the entrant surface of a test specimen at an angle to normal relative to the entrant surface thereof and independent of variations in sound velocity in the medium caused by temperature changes, which comprises a piezoelectric transducer, means for ultrasonically vibrating said transducer, a solid member constructed of a material through which ultrasonic vibrations may propagate positioned in the liquid medium and having one face at an angle to normal, the transducer being effectively coupled to said angle face, said member having a second face through which the vibrations are transmitted, the second face being parallel to the entrant surface of the test specimen, and a quantity of the liquid medium interposed between said transducer and said entrant surface of said test specimen exhibiting a transit time for said vibrations at least equal to the transit time of such vibrations in the test specimen.

2. A device as specified in claim 1, in which the member is an acoustic wedge.

3. A device as specified in claim 1 wherein said quantity of liquid medium is interposed between said member and said entrant surface.

4. A device as specified in claim 1 wherein said quantity of liquid medium is interposed between said transducer and said member.

References Cited in the file of this patent

UNITED STATES PATENTS

| | | |
|---|---|---|
| 2,483,821 | Firestone | Oct. 4, 1949 |
| 2,787,158 | Van Valkenburg et al. | Apr. 2, 1957 |

FOREIGN PATENTS

| | | |
|---|---|---|
| 714,564 | Great Britain | Sept. 1, 1954 |